United States Patent
Li

(10) Patent No.: US 7,164,655 B2
(45) Date of Patent: Jan. 16, 2007

(54) METHOD AND TRANSCEIVER FOR A DATA PACKET ORIENTED COMMUNICATION SYSTEM

(75) Inventor: Hui Li, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1029 days.

(21) Appl. No.: 10/218,736

(22) Filed: Aug. 14, 2002

(65) Prior Publication Data

US 2003/0053482 A1    Mar. 20, 2003

(30) Foreign Application Priority Data

Aug. 16, 2001 (EP) .................... 01119816

(51) Int. Cl.
*H04J 3/14* (2006.01)
(52) U.S. Cl. ..................... 370/232; 370/465
(58) Field of Classification Search ............... None
See application file for complete search history.

(56) References Cited

U.S. PATENT DOCUMENTS

| | | | | |
|---|---|---|---|---|
| 4,259,740 A * | 3/1981 | Snell et al. | ............... | 370/465 |
| 5,151,904 A * | 9/1992 | Reiner et al. | ............... | 714/795 |
| 5,526,399 A | 6/1996 | Kameda | ............... | 379/58 |
| 5,701,514 A * | 12/1997 | Keener et al. | ............... | 710/14 |
| 6,272,318 B1 * | 8/2001 | Yoshioka | ............... | 370/465 |
| 6,345,039 B1 * | 2/2002 | Ito | ............... | 370/232 |
| 6,549,938 B1 * | 4/2003 | Kilkki et al. | ............... | 370/465 |
| 6,937,582 B1 * | 8/2005 | Kronestedt | ............... | 370/465 |

FOREIGN PATENT DOCUMENTS

| | | |
|---|---|---|
| EP | 0 996 248 A1 | 4/2000 |
| EP | 1137217 A1 | 9/2001 |
| WO | WO 99/12304 | 3/1999 |
| WO | WO 00/13364 A | 3/2000 |

OTHER PUBLICATIONS

Tannenbaum A., "Computer Networks," 3d ed. Prentice-Hall International Inc. 1996, .28-39.
Khun-Jush, J. et al., "Structure and Performance of the HIPERLAN/2 Physical Layer," Procedures VTC '99, Fall 1999, pp. 2678-2671.
European Search Report, Application No. EP 01 11 9816, Jan. 29, 2002, pp. 1-3.
Kansari, M. et al., "Low Bit-Rate Video Transmission over Fading Channels for Wireless Microcellular Systems," IEEE Inc , New York, US, vol. 6, No. 1, Feb. 1, 1996, pp. 1-11.

\* cited by examiner

*Primary Examiner*—Doris H. To
*Assistant Examiner*—Phuongchau Ba Nguyen

(57) ABSTRACT

A method and a transceiver for selecting a current transmission mode in a data packet oriented communication system involves measuring a current radio link quality for the radio link; estimating on the lower layer a first status value corresponding to a state of the automatic request buffer on the higher layer; determining on said lower layer a second status value corresponding to a state of the automatic request buffer on said lower layer; calculating for said lower layer a target transmission rate based on the first and the second status values; identifying from the set of the available transmission modes a subset of transmission modes, each providing a maximum transmission of data packets for radio link quality values lower than the current radio link quality; and selecting from said subset a transmission mode as the current transmission mode, which provides a transmission rate closest to the calculated target transmission rate.

15 Claims, 5 Drawing Sheets

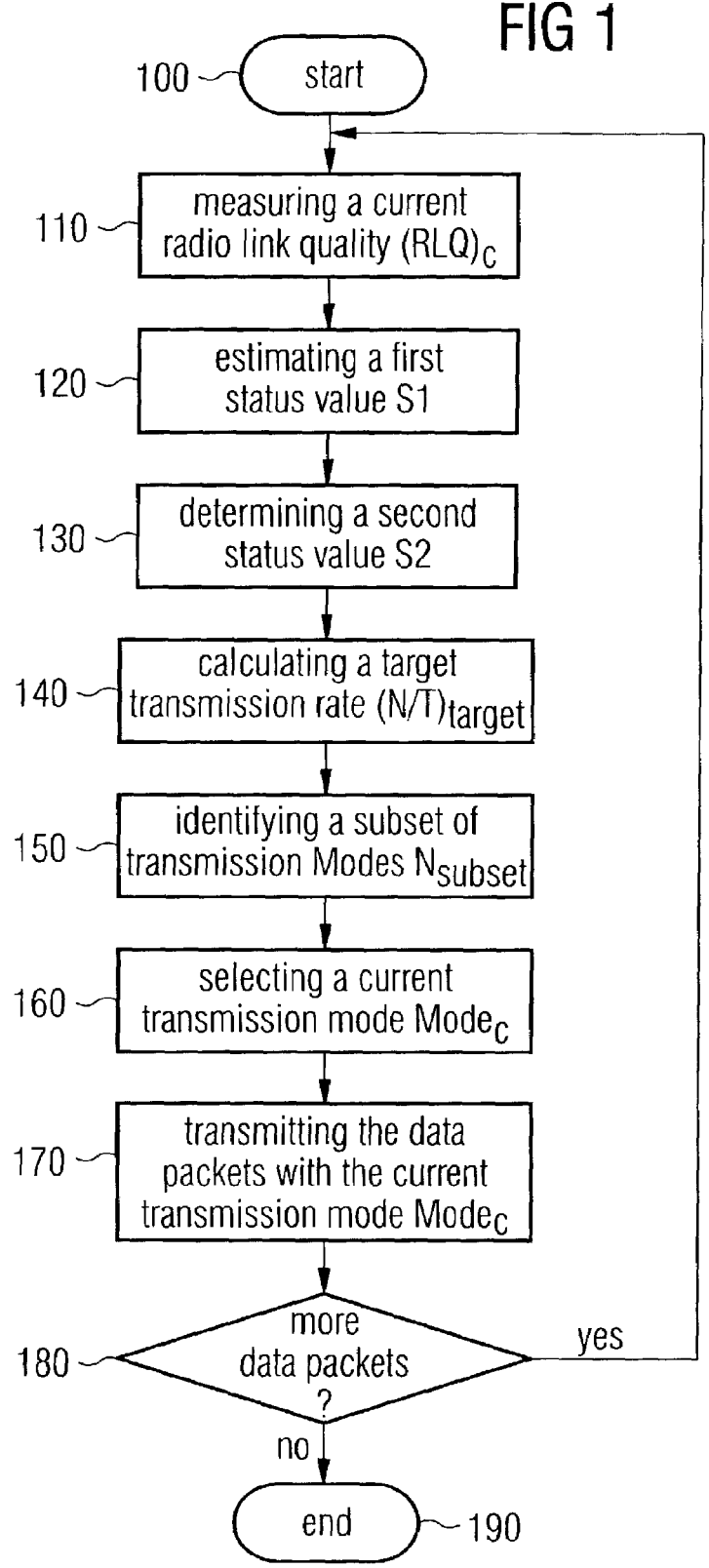

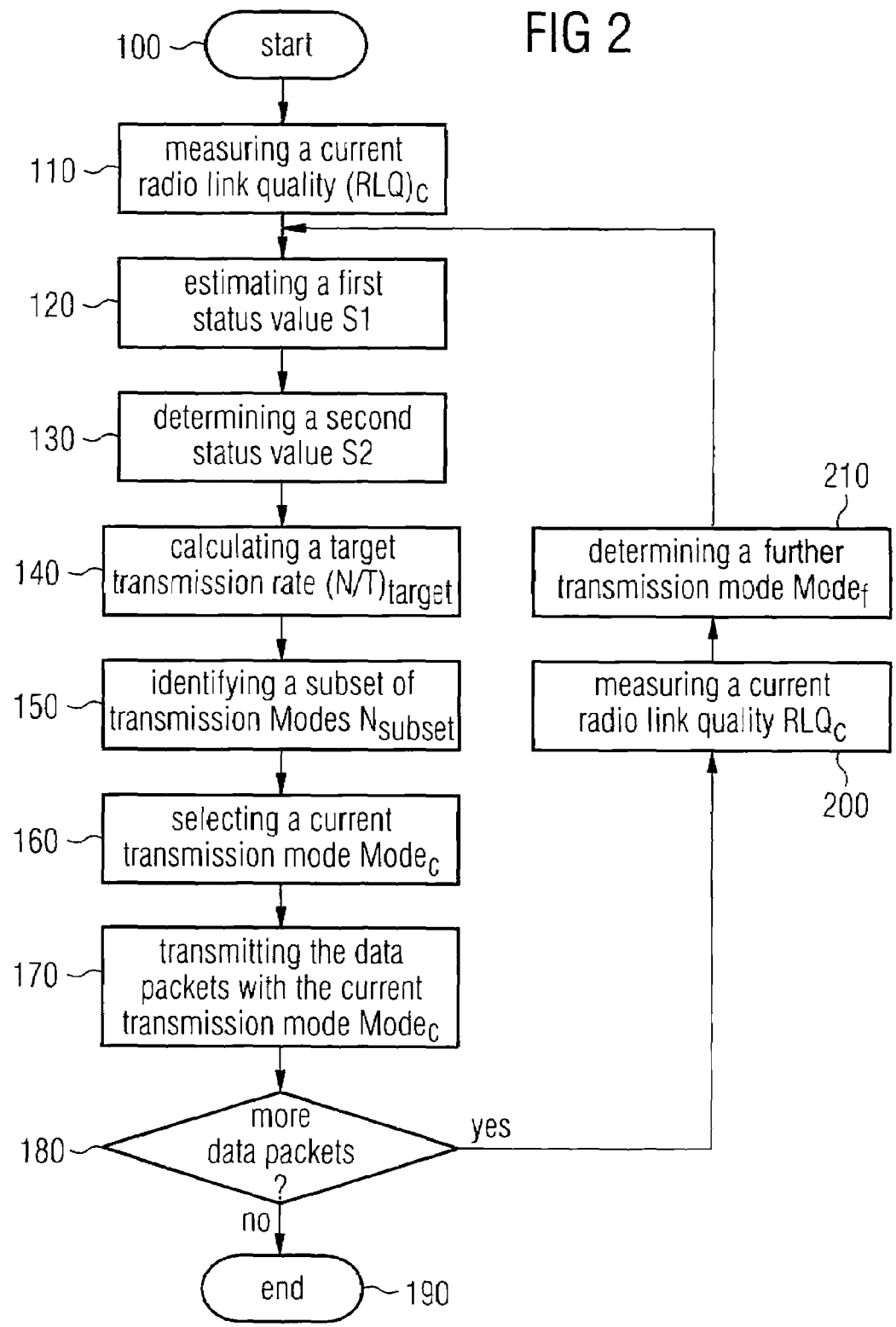

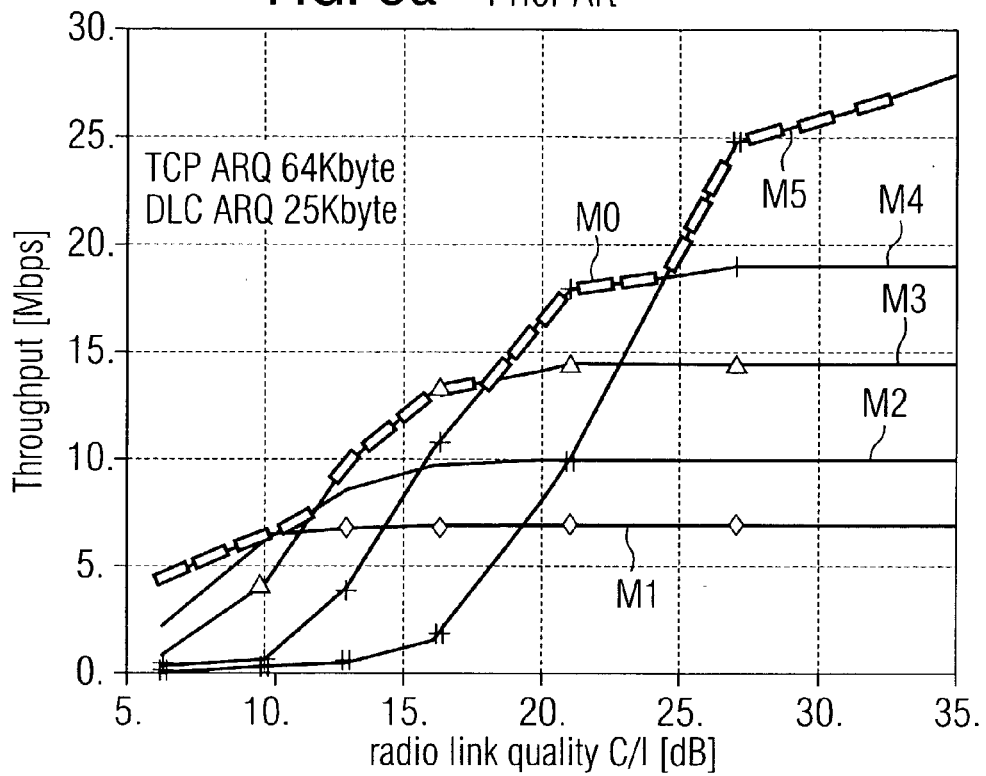
FIG. 5a "Prior Art"
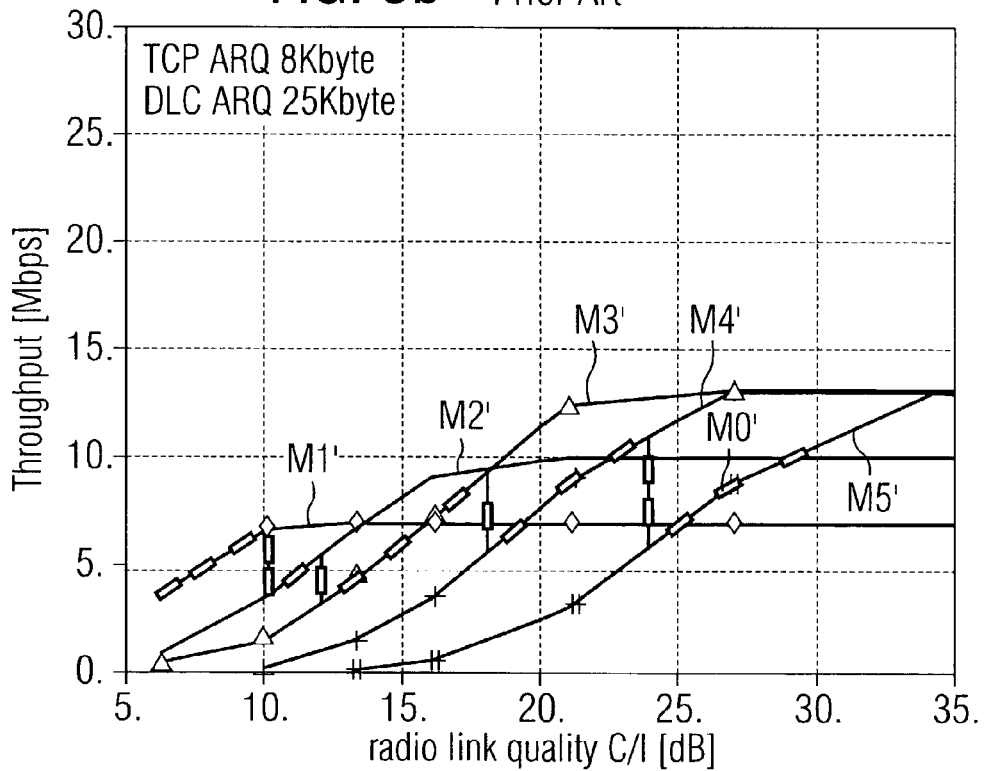
FIG. 5b "Prior Art"

METHOD AND TRANSCEIVER FOR A DATA PACKET ORIENTED COMMUNICATION SYSTEM

BACKGROUND OF THE INVENTION

1. Technical Field of the Invention

The present invention relates to a method and a transceiver for a data packet oriented communication system. Even more particularly the present invention relates to a method and a transceiver for selecting a current transmission mode from a set of available transmission modes, where each transmission mode provides a specific transmission rate for transmitting the data packets.

2. Description of Related Art

A data packet oriented communication system, where at least two transceivers are connected by a radio link is a part of a data packet oriented communication network, which includes several transceivers connected by several physical links. A physical link, where the data packets are transmitted via radio transmission is called a radio link. Examples for such a data packet oriented communication system with a radio link are standardised Hiperlan/2 systems, IS-136 systems or EDGE systems.

In general a data packet oriented communication system can be described with the help of a Reference Model, which is developed by the International Standards Organisation [Tanenbaum, Andrew S.: "Computer Networks", $3^{rd}$ ed., Prentice-Hall International Inc. 1996, p.28ff]. Here, each transceiver is depicted as having several layers. Each layer represents an exact defined system function of the transceiver and can be developed independent from each other.

Such a Reference Model is for example the TCP/IP Reference Model, which can be used to describe a data packet oriented communication system with a radio link, like e.g. a HIPERLAN/2 system. Here, the layer closest to the radio link, is the Host-To-Network-Layer. This Host-To-Network-Layer can be subdivided into the Physical-Layer (PHY-Layer) and the Data-Link-Layer (DLC-Layer). Both layers perform efficient and reliable data transmission via the radio link. Above the DLC-Layer there is the Internet-Protocol-Layer (IP-Layer). In order to guarantee a reliable data transmission between a source transceiver and a destination transceiver and to avoid congestion in the network, a Transport Control Protocol Layer (TCP-Layer) is used above the IP-Layer. Next to the TCP-Layer there is the Application-Layer, which represents the different applications, like Internet applications etc.

Data packets created on an Application-Layer are transferred through the subsequent layers, wherein on each layer the data packets are temporary stored in a buffer, before transferred to the next layer. Finally on an Physical-Layer a transmission mode is selected for transmitting the data packets on the radio link. The data packets are transmitted on the radio link in time frames. In general, the performance of each layer and the radio link is measured in a throughput or transmission rate value. The throughput as well as the transmission rate are defined as the ratio of the amount of data and the time needed for the transmission of the data. Both, the throughput and the transmission rate have an unit of bit per second (bit/s) and can be measured on each layer of the data packet oriented communication system. The throughput on the TCP-layer is the most important one, because this further called as the overall throughput is visible to an user of that data packet oriented communication system.

As described in [Jamshid Khun Jush: "Structure and performance of the Hiperlan/2 Physical Layer"; Procedures VTC'99 Fall 1999], the key feature of the Physical-Layer is to provide several transmission modes with different coding and modulation schemes, which are selected by link adaptation. Depending on the radio link quality, the PHY-Layer selects for each link quality parameter, that transmission mode with the highest transmission rate. As a result, on the PHY-Layer the throughput of data packets is optimised depending on the selected transmission mode.

Such a method for selecting a transmission mode is also known from WO99/12304. For it, the transmission rate for all available transmission modes will be compared. The transmission mode with the maximum transmission rate is selected as the suitable transmission mode for transmitting the data packets via the physical link.

Also as e.g. known from U.S. Pat. No. 5,526,399, in conventional mobile radio communications systems a method for realising error free data transmission is employed. Such a method is the automatic repeat request (ARQ) mechanism, wherein a request for transmission of data is repeated at the transmission side, when a transmission error of data occurs on the reception side. This method is also applied in data packet communication systems. Therefore on the layer at least parts of the buffer size are used as an automatic request buffer (ARQ-buffer) for temporarily storing data packets to be transmitted and data packets to be retransmitted, when erroneously transmitted before. Thereupon a state of the automatic request buffer in a layer depends on the erroneous transmitted data packets. The amount of erroneous transmitted data packets can be measured with an error rate value. The higher the error rate, the more of the buffer space is blocked by data packets to be retransmitted.

In EP00105836.1, a further method for selecting a transmission mode is shown. Here the selection, which is established on the PHY-Layer, is based on the radio link quality and the state of the automatic request buffer on the DLC layer. It is shown that on the DLC-Layer the throughput of data packets is improved, by taking into account the link quality and the buffer state on the DLC-Layer.

To achieve an optimal data throughput on the PHY-layer, the selection method according to WO99/12304 seems appropriate for data packet oriented communication systems, where the transceivers have very large ARQ buffers on the DLC- and TCP-layer. Under this assumption, the optimisation of the throughput on the PHY-layer and on the TCP-layer is equivalent. But this is an assumption that is not applicable for all data packet oriented communication systems. Contrary the selection method according to EP00105836.1 seems appropriate in applications made, where the buffer sizes on the DLC-layer is limited to about 30 kbyte and the buffer size on the TCP-layer is limited to 64 kbyte, like for example when personal computers or desktop computers are connected via a radio link.

Both above described methods are applicable under the assumption that the automatic request buffer on the TCP-Layer has a size that is larger than 30 kbyte. Then the overall throughput, which in the course of the following is understood as the data throughput between the TCP layer and the application layers in destination or receiving transceiver, can be optimised. FIG. 5a shows an simulation of such an overall throughput for an Hiperlan/2 system. Here the throughput for each selected transmission mode (M1, . . . , M5) is depending from the link quality C/I and the dashed line (M0) shows the achievable optimised overall throughput.

But, if e.g. a Notebook will be used in such a data packet oriented communication system, then the buffer size on the TCP layer in such a notebook usually is limited to around 8Kbyte. If the link quality is poor, that means that the radio link quality is not error free, more data packets have to retransmitted and thus the ARQ buffer in the DLC layer of the source transceiver is filled. As a consequence also the ARQ buffer in the higher layers will be blocked. As a result the overall throughput in the destination transceiver, which is visible to an user, will be reduced. Additional, if the TCP buffer is limited, that TCP buffer will be blocked even faster and the overall throughput will decrease more. The conclusion is that a limited buffer is more sensitive to the radio channel error than a large buffer. This then leads to the disadvantage that the maximum throughput will not be achieved. In FIG. 5b the dashed line shows the simulated overall throughput M0' for a Hiperlan/2 system, where the buffer size on the TCP layer is limited and where a transmission mode M1', . . . ,M5' is selected on the PHY-layer, without regarding the limitation of the buffer size on the TCP layer. Thus, while the DLC-Layer, selects the current transmission mode without any knowledge about the buffer size in the TCP-Layer, the overall throughput is not optimised. More specifically, if the lower layer selects a transmission mode under the assumption of an unlimited buffer size in the higher layer, but that buffer size is limited, then the overall throughput decreases. This restricts the system performance not only in the above described applications, but also in applications, where for example a combination of different transceivers like a personal computer with an unlimited TCP buffer and a notebook with a limited buffer are connectable via a radio link.

A conceivable solution to overcome the above described problems could be, that the different layers provides each other with a protocol about their current state, like e.g. the fullness or state of their buffer. But this seems not practical, because then the layers which are usually developed independent from each other have to be modified. Therefore the standard for the data packet oriented communication system has to be modified, which needs a long time and which is normally very expensive, because the existing transceivers must be additionally equipped with the new standards. More precisely new protocols between the layers have to be developed and standardised.

Consequently, a need exists for a method and a transceiver in a data packet oriented communication system, which avoids the described above disadvantages. It is therefore a principle object of the invention to have a method and a transceiver, where a current transmission mode is selected on the lower layer, which achieves a maximum and robust transmission rate and therefore an optimised overall throughput, which is visible to an user. It is still further an object of the present invention to have a method and transceiver, where a maximum and robust transmission rate is achieved, which is independent of the buffer size on the higher layers. Further objects of the present invention will become clear as the description proceeds.

SUMMARY OF THE INVENTION

According to one aspect of the present invention, there is provided a method for selecting a current transmission mode in a data packet oriented communication system comprising the steps of: measuring a current radio link quality for the radio link; estimating in the lower layer a first status value, which corresponds to a state of the automatic request buffer in the higher layer; determining in the lower layer a second status value, which corresponds to a state of the automatic request buffer in said lower layer; calculating for said lower layer a target transmission rate, for transferring the data packets within a time interval, and wherein said target transmission rate is based on the first and the second status value; identifying from the set of the available transmission modes a subset of transmission modes, each of said transmission modes in the subset provides a maximum transmission of data packets for radio link quality values lower than the current radio link quality; and selecting from said subset a transmission mode as the current transmission mode, which provides a specific transmission rate closest to the calculated target transmission rate.

In data packet oriented communication systems, as known from the prior art, the lower layer selects a transmission mode, based on the radio link quality or based on the link quality and the state of the automatic request buffer on that lower layer. The invention however proposes to take additionally into account the state of the automatic request buffer from the higher layer. More precisely, the state of the ARQ buffer on the higher layer, especially the TCP-layer is estimated on the lower layer, which is here the DLC-layer. The DLC layer then selects the transmission mode depending on that estimated ARQ state from the higher layer and the determined ARQ state from the lower layer and the available transmission modes on the PHY-layer or DLC-layer.

Advantageously, the proposed inventive method optimise the overall throughput of a data packet oriented communication system, when transceivers with different hardware profiles, like for example notebooks and personal computers with different ARQ buffer sizes, are used in the same system. The method of the present invention does not need any changes of the existing TCP- or IP-layer protocols nor any additional new interlayer protocol between that TCP- or IP-layer and the DLC-layer. Further the proposed method does not need any changes of the DLC-layer standards of an existing data packet oriented communication systems. Therefore the method according to the inventive concept is immediately implemented in such an existing communication system.

Preferably it is an advantage of the present invention, that a considerable decrease of the overall throughput is avoided in applications, where the buffer size on the TCP layer is limited. Because the state of the ARQ buffer on the TCP-layer is estimated on the DLC-layer, the selection of a transmission mode on that DLC-layer can be additionally based on that state of the ARQ buffer on that higher layer. Thus a slump of the overall throughput is avoided, while the DLC-layer reverses the selected current transmission mode when the radio link quality is changing.

It is still further an object of this invention to provide a method for selecting a current transmission mode in a data packet oriented communication system, wherein the step of estimating in the lower layer the first status value includes the step of temporarily storing in the lower layer a first set of data packets transferred from the higher layer.

This is advantageous, because as explained above, the layers are in general developed independent from each other. The only interface is the transmission of data packets between the layers. That means, that the higher layer, like e.g. the TCP-layer can be developed independent from the lower layer, like e.g. the DLC-layer. More precisely one company can develop the lower layer, whereas the higher layer is developed by another company. But, when applying the proposed method, then an additional protocol between the layers, which includes information about the state of an automatic request buffer on a layer is not needed. Thus it is advantageous, that a first set of data packets, which are transferred from the higher layer, is temporarily stored on said lower layer. And a first status value, respectively the state of the ARQ buffer on the higher layer, is then estimated on the lower layer based on that first set of data packets transferred from that higher layer.

Therefore a first data rate is estimated based on either a first set of data packets temporarily stored within a time interval or the time delay between an input and output of the first set of data packets. A time delay means the difference between the time when the first set of data packets are transferred from the higher layer and temporarily stored in the buffer on the DLC layer and the time when that first set of data packets are transferred out of that buffer on the DLC layer. Advantageously for detection of the state of the ARQ buffer in the higher layer, there is no additional protocol between the higher layer and the lower layer needed. Because either the amount of data packets, which is transferred from the higher layer, and which is defined as the first set of data packets, is detected in the buffer on the lower layer or alternatively the time difference is detected, how long a first set of data packets is temporarily stored on the lower layer.

Optionally, it is advantageous to determine a further transmission mode for transmitting the data packets on the radio link and to additionally perform the selection of the current transmission mode on that selected further transmission mode.

Advantageously, the current radio link quality for the next transmission of data packets and the radio link quality during the previous transmission of data packets are taken into account in the selection process of the current transmission mode. Therefore, the selected transmission mode is able to provide an optimal throughput from the point of view of the DLC and TCP layers and to provide a reliable transmission from the point of view of the PHY layer.

According to another aspect of the present invention, there is provided a transceiver for selecting a current transmission mode in a data packet oriented communication system, having means for estimating on the lower layer a first status value, which corresponds to a state of the automatic request buffer on the higher layer, and means for calculating for the lower layer a target transmission rate, wherein the target transmission rate is based on the first and the second status value.

As described above, the different layers are in general developed independent from each other. That means that the only interface between the different layers is the transmission of data packets. An additional protocol, which for example includes information about a state of an automatic request buffer on a layer is not foreseen. Thus, according to the present invention, it is an advantageous embodiment that the data packets are transferred from the higher layer into the means for storing said data packets on the lower layer. More general, with the means for estimating in the lower layer a first status value, where such means for storing are included, the state of the ARQ buffer from the higher layer can be considered during the selection. Thus, while using means for estimating a first status value, which corresponds to the state of the ARQ buffer in the higher layer, the selection of a current transmission mode is optimised and can be realised without any additional modification in the transceiver. More precisely, to achieve an improved selection of a current transmission mode according to the present invention, it is evident that means for estimating are provided to estimate on the lower layer a first status value, respectively a state of the ARQ buffer in the higher layer. Then in the means for calculating for the lower layer a target transmission rate, the target transmission rate is calculated based on the state of said lower layer and the estimated state on the higher layer. Then also the means for selecting a current transmission mode can choose said current transmission mode for optimised data transmission, with the help of said first status value.

BRIEF DESCRIPTION OF THE DRAWINGS

In the following the invention will be further described according to the figures and by means of examples, wherein FIG. 1 is a flow chart illustrating the method for selecting a current transmission mode according to a one aspect of the invention;

FIG. 2 is a flow chart illustrating the method for selecting a current transmission mode according to a further aspect of the invention;

FIG. 5a depicts simulated throughput curves in a prior art Hiperlan/2 system with an unlimited buffer on the higher layer; and FIG. 5b depicts simulated throughput curves in a prior art Hiperlan/2 system with a limited buffer on the higher layer.

DETAILED DESCRIPTION OF THE INVENTION

Figure 3A:
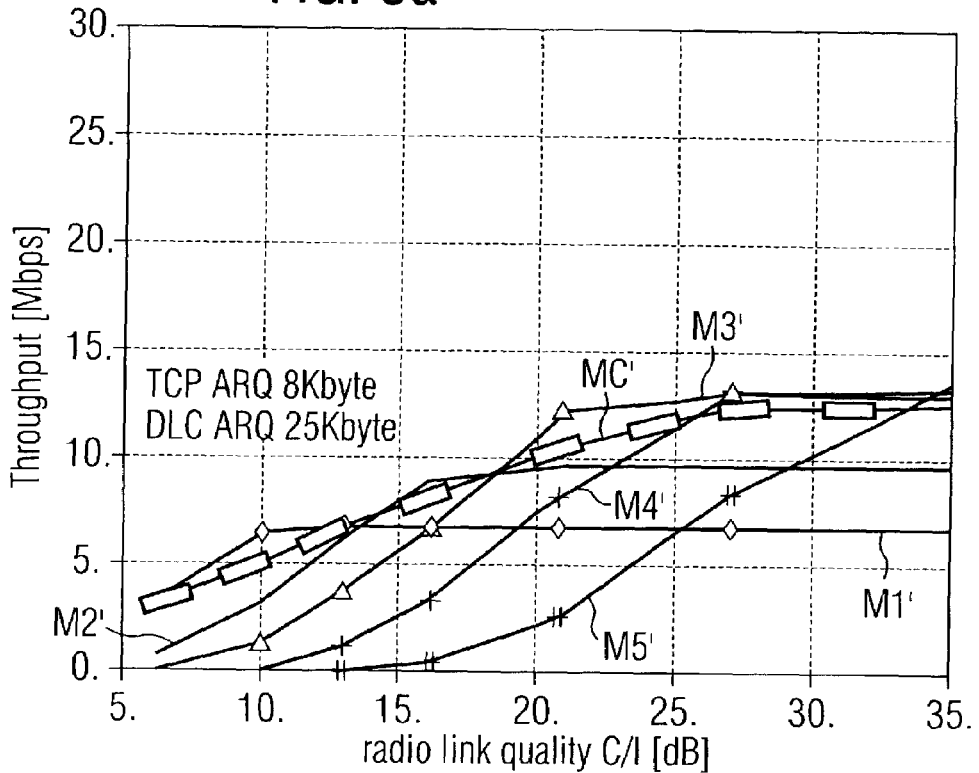
FIG. 3a depicts simulated throughput curves in a Hiperlan/2 system according to the inventive concept with a limited buffer on the higher layer.

Reference is now made to the Drawings wherein like reference characters denote like or similar parts throughout the various Figures. Referring now to FIG. 5 FIGS. 5a and 5b, there are shown simulated throughput versus radio link quality curves M1, . . . ,M5 and M1', . . . ,M5' for a Hiperlan/2 system, in order to facilitate an understanding of the present invention. Here different transmission modes M1, . . . ,M5 and M1', . . . ,M5' are provided for the transmission of data packets via the radio link, where for each transmission mode a throughput of data packets can be expected. Again, in the context of the present invention, a data packet oriented communication system is defined as having at least two transceivers, which are connected via a radio link. For example a mobile terminal is connected with a central unit, like an access point or alternatively two mobile terminals are connected via a radio link. The inventive concept will explained for a Hiperlan/2 system, with two transceivers. In such a Hiperlan/2 system, the data packets are transmitted in frames with a duration of 2 ms on the radio link. Each frame includes one or more bursts, wherein in each burst one or more data packets are transmitted. Further each frame includes an allocation part, where for each burst or all bursts a transmission mode is allocated. Each transceiver is defined as having higher layers, like e.g. the TCP-layer and lower layers, like e.g. the DLC-layer. Data packets, which are transferred between the different layers and/or via the radio link can be stored or temporarily stored in buffers on the layers. The buffer size on the layers can be used completely or in parts as an automatic request buffer, further often named as ARQ buffer. In such an ARQ buffer, the data packets are stored before they are further transferred or transmitted. The terms throughput or transmission rate means a transmission of data packets within a time interval between different layers. The term overall throughput means the transport of data packets between the TCP layer to the application layer in the receiving transceiver. To achieve for each radio link quality value an optimised throughput of data packets, in dependence of the radio link quality C/I on the radio link, a transmission mode is selected on the DLC-layer. The overall throughput M0 and M0' are the resulting curves with maximum achievable throughput over the whole range of the radio link quality. In FIG. 5a, there are shown the simulated specific transmission rate curves for the transmission modes M1, . . . ,M5 and the expected overall throughput curve M0 for a Hiperlan/2 system, where the ARQ buffer on the TCP-layer has a size of 64 kByte and the ARQ buffer on the DLC-layer has a size of 25 KByte. In such a case it can be assumed that the TCP-layer has an unlimited buffer size. On the DLC-layer, a figure as for example shown in FIG. 5a is stored. Based on that stored figure the DLC-layer selects that transmission mode, for which a maximum throughput is expected for a particular radio link quality value C/I. For example the transmission mode M2 is used in the C/I range of 10 dB to 12 dB, whereas the transmission mode M3 is selected in a range of 12 dB to 18 dB. If the C/I value is 12 dB, the DLC layer switched between that two transmission modes M2 and M3. In FIG. 5b there are shown the simulated throughput curves for a data packet oriented communication system, where the ARQ buffer size on the TCP-layer is limited to 8 Kbyte and the ARQ buffer on the DLC layer is the same as in FIG. 5a. As one result of that limited buffer size, the throughput of each of the transmission modes M1', . . . ,M5' is reduced. As explained above, in known standardised data packet oriented communication systems a transmission mode is selected on the lower layer in dependence of the measured radio link quality. But the selection is established without any knowledge of the state of the ARQ buffer on the higher layer. Because the lower layer then chooses one of the transmission modes M1', . . . ,M5', based on the stored figure like FIG. 5a, the overall throughput M0' is noticeably reduced. For example, when in a situation like e.g. shown in FIG. 5b the DLC layer selects a transmission mode, based on the stored FIG. 5a, then for example the transmission mode M2' is selected for the radio link quality range from 10 dB to 12 dB. But then a lower overall throughput is achieved, as if it would used the transmission mode M1' instead. Thus, as shown in FIG. 5b, the zigzag curve M0' shows the overall throughput, when transmission modes are selected in a case where the TCP buffer is limited, but the selection of the transmission modes is based on an assumption of an unlimited TCP buffer. In such a case, where the TCP buffer is unlimited, the selection based on the stored figure would lead to a maximum throughput M0 as it is shown in FIG. 5a.

Now referring to FIG. 1 the principal method according to the present invention, which avoids the disadvantage of known data packet oriented communication systems, will be explained in more detail. Therefore, in a preliminary step 100 the selection process is started. Then, in a first step 110 of the preferred method according to the present invention, the current radio link quality $RLQ_C$ for the radio link is measured. In a next step 120, on the DLC-layer a first status value S1 is estimated, which corresponds to a state of the ARQ buffer on the TCP-layer in the transceiver. Ideally this step 120 is done by temporarily storing the data packets, which are delivered from the TCP- or IP-layer, in parts of the buffer on the DLC-layer. With it, a free space in the ARQ buffer on the TCP layer can be estimated. Next a step 130 follows, where a second status value S2 is determined. This can be done by regarding a state of the ARQ buffer on the DLC-layer, where data packets are stored which are waiting for the transmission or retransmission via the radio link. In a next step 140, a target transmission rate is calculated, which is identical to the maximum number of data packets, which are waiting for transmission from the DLC-layer to the PHY-layer. In the next step 150, a subset $N_{subset}$ of transmission modes is identified, which provides a reliable data transmission. Therefore from the set $N_{set}$ of available transmission modes $Mode_1$, which are for example in FIG. 5a the transmission modes M1 to M5, a subset of transmission modes is identified, which of said transmission modes provides a maximum transmission of data packets for radio link quality values RLQ lower than the current radio link quality $(RLQ)_c$. Next a step 160 follows, where the current transmission mode $Mode_c$ is selected, which provides a specific transmission rate $(N/T)_1$ closest to the calculated target transmission rate $(N/T)_{target}$. In a final step 170, the data packets are transmitted with the selected current transmission mode in a frame via the radio link. After that step 170, there is a selection step 180. If in step 180 it is found that more data packets are waiting for transmission via the radio link then the process started from the step 110 again. If it is found that there are no more data packets waiting, then the process ends 190.

Additionally it is in accordance with an advantageous embodiment of the present invention to determine a further transmission mode for transmitting the data packets on the radio link. Thus, based on the radio link quality a further transmission mode $Mode_f$ is selected and the selection of the current transmission mode $Mode_c$ is based on the first status value S1, the second status value S2 and that further transmission mode $Mode_f$. The method for selecting the current transmission mode $Mode_c$, which is additionally performed on the further transmission mode $Mode_f$ will now be explained in more detail based on the flow chart, as depicted in FIG. 2. After the selection method is started 100, the process steps 110 to 180 will be established in the same manner as described before with respect to the flow chart as shown in FIG. 1. If, in step 180 it is found that more data packets are waiting for transmission via the radio link, then the process step 200 follows, where the current radio link quality $RLQ_C$ is measured again. The measured radio link quality RLQ can be explained by the carrier to interference ratio C/I or the packet error rate PER of the radio link. Then the step 210 follows, where depending on the current radio link quality $RLQ_C$ a further transmission mode $Mode_f$ is determined. In more detail, if for example the packet error rate of the radio link is measured and that is lower than a first boundary, a transmission mode is determined as the further transmission mode, which has a higher transmission rate than the last selected current transmission mode. If the packet error rate is higher than a second boundary, a transmission mode is determined as the further transmission mode, which has a lower transmission rate, than the selected current transmission mode. If the packet error rate is between that first and second boundary the further transmission mode is set as the last selected current transmission mode. After the further transmission mode is determined the process is repeated from step 120. If, in step 180 it is found that no more data packets are waiting for transmission the process ends with step 190.

This method is advantageously used, when several data packets have to be transmitted in several bursts within a frame or several data packets have to be transmitted in several frames. Then after starting with step 100 and following the steps 110 to 180, the selection of the following selected current transmission mode for the next set of data packets can be additionally based on that further transmission mode. It is also common practice for a man skilled in the art that the described steps 120 to 180 and 200 to 210 includes the variation in sequence of the steps, that at first for each of all the bursts within a frame a transmission mode is selected and then, in a final step 170, the data packets are transmitted via the radio link.

Figure 3B:
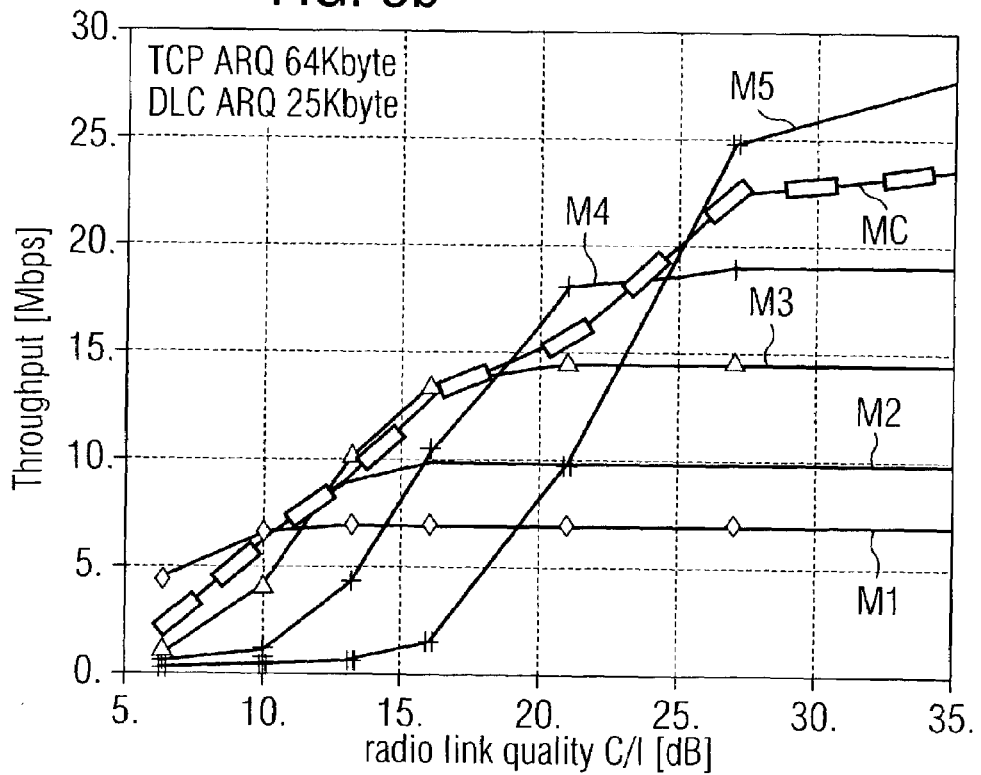
FIG. 3b depicts simulated throughput curves in a Hiperlan/2 system according to the inventive concept with an unlimited buffer on the higher layer.

Now referring to FIGS. 3a and 3b, there are shown the simulated results for a Hiperlan/2 system of the applied inventive concept of the present invention. FIG. 3a shows the throughput curves M1', . . . , M5' for a data packet oriented communication system, with a limited ARQ buffer on the TCP layer, whereas FIG. 3b shows the throughput curves M1, . . . , M5 for a system with an unlimited ARQ buffer. Comparing the simulated overall throughput MC' according to the inventive concept, as depicted in FIG. 3a with the simulated overall throughput MO' for a prior art system, as depicted in FIG. 5b, a significant increase of the overall throughput MC' is visible compared to that one MO'. The overall throughput curve MC' shows obviously no decreased throughput, compared to the "zigzag" curve of the overall throughput MO' as depicted in FIG. 5b. The optimised overall throughput curve MC' in FIG. 3a is closer to the maximum achievable throughput or in other words the maximum transmission of data packets, which is the throughput on the top of each of the transmission modes M1', . . . ,M5'. And, as is depicted in FIG. 3b, also in data packet oriented communication systems, where on the TCP layer the buffer size is unlimited, there is no significant difference between the overall throughput MC compared to the overall throughput MO as simulated for prior art systems, as depicted in FIG. 5a. Thus the proposed method is also applicable in such a case. Again, the proposed method according to the inventive concept allows a maximised overall throughput independent of the buffer size on a higher layer in a transceiver.

Figure 4:
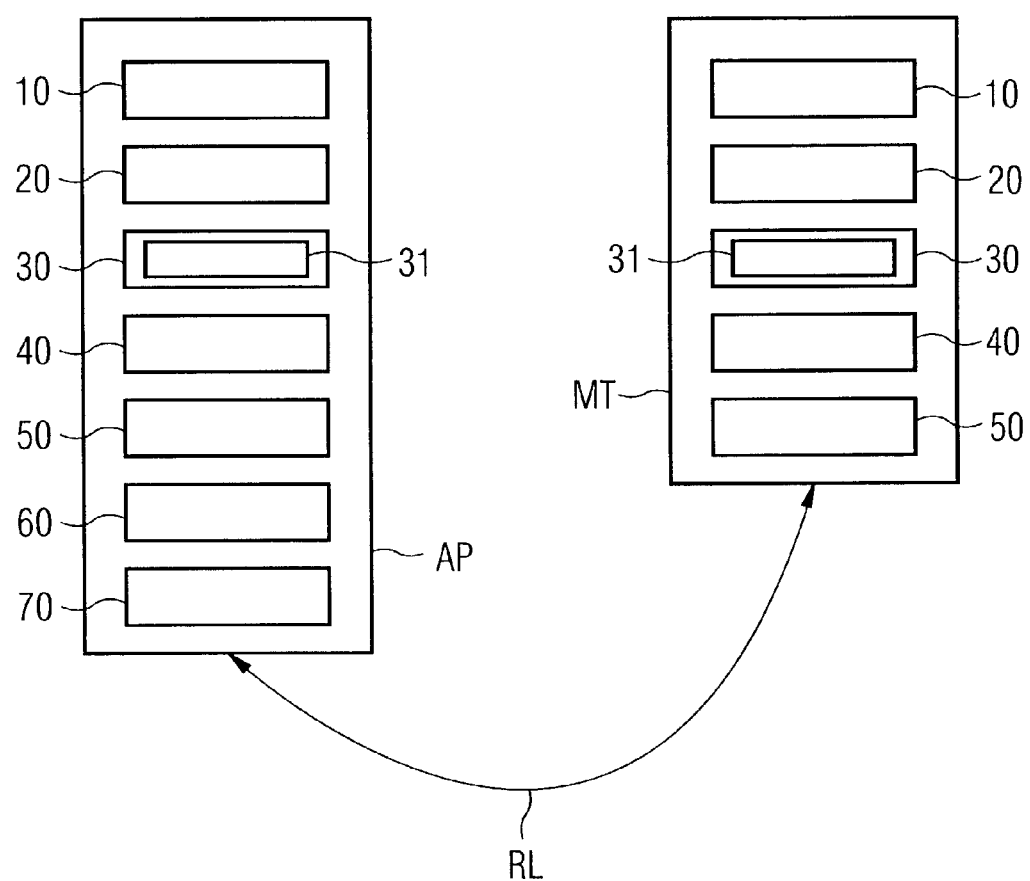
FIG. 4 is a block diagram of a Hiperlan/2 system, with an access point as a first transceiver and a mobile station as a second transceiver.

In FIG. 4, a HIPERLAN/2 system is shown. Here a first transceiver AP is an access point and the second transceiver MT is a mobile terminal. Both transceivers MT and AP includes a TCP-layer as higher layer and a DLC-layer as lower layer and both transceivers are connected via a radio link RL. According to the inventive concept of the present invention, both the mobile terminal MT and the access point AP having means 10 for measuring the current radio link quality $RLQ_c$, means 20 for determining on the lower layer a second status value S2, means 30 for estimating on the lower layer a first status value S1 and means 40 for calculating for the lower layer a target transmission rate $(N/T)_{target}$. The transceivers MT and AP can further have means 50 for determining a further transmission mode $Mode_f$. In a HIPERLAN/2 system the access point AP is the responsible transceiver for the assignment of transmission resources, like e.g. the selection of a current transmission mode $Mode_c$ for transmitting the data packets over the radio link RL. Therefore the access point AP further having means 60 for identifying a subset $N_{subset}$ of transmission modes and means 70 for selecting from that subset the current transmission mode $Mode_c$. The above described means 10,20, 30,31,40,50,60 and 70 are used as a synonym for all kind of hardware, that can be used in an access point AP or mobile terminal MT for the proposed processes. Therefore general purpose processing devices like so called micro processors, dedicated programmable hardware like so called digital signal processors as well as hardware programmable logic circuit like ASIC's should be covered by the means 10,20, 30,31,40,50,60 and 70.

The data packets, which in the context of a Hiperlan/2 system are called packet data units PDU's, are transmitted via the radio link RL in uplink or downlink direction. In the uplink direction the mobile terminal MT is the transmitter of the data packets and the access point AP is the receiver of the data packets, whereas in the downlink direction the access point AP is the transmitter and the mobile terminal MT is the receiver of the data packets. Because the access point AP is responsible for the selection of the current transmission mode $Mode_c$ for both the uplink and downlink direction, the mobile terminal MT has to transmit via the radio link RL a resource request to the access point AP.

To give a more detailed understanding of the inventive concept of the present invention, the proposed method will now explained for the uplink direction in the Hiperlan/2 system as shown in FIG. 4. To give also an understanding of the step of determining a further transmission mode $Mode_f$, the downlink direction is explained for a selection routine, after an established first one. That is, from the step 180 through step 200 and step 210 the method passes the steps 120 to 180 for a second time. Again, in a Hiperlan/2 system the data packets are named as packet data units (PDU's).

In the uplink direction, where the Access point AP is the receiving transceiver, in the access point AP the means 10 for measuring the current radio link quality $RLQ_c$ measures the current PDU error rate PER as following:

$$PER = \frac{\text{Number of erroneous } PDU \text{ received}}{\text{Number of total } PDU \text{ received}}$$

Then in the means 50 for determining a further transmission mode two bounds are set, i.e. a low PER bound (LPB) and upper PER bound (UPB). If it is indicated that the PDU error rate PER is lower than LPB, that transmission mode is selected as further transmission mode $Mode_f$, which is the next one with a higher specific transmission rate as compared to the current transmission mode $Mode_c$ used for the last established transmission. If it is indicated that PER is between LPB and UPB, the further transmission mode $Mode_f$ should be identical to the current transmission mode $Mode_c$ used for the last established selection routine. If it is indicated that PER is larger than UPB, that transmission mode is selected as further transmission mode $Mode_f$, which is the next one with a lower specific transmission rate as compared to the current transmission mode $Mode_c$, which was used for the last established transmission. Additionally in the mobile terminal MT, the means 20 determining on the DLC-layer of that mobile terminal MT a second status value S2, which corresponds to a state of the automatic request buffer on that DLC-layer. Therefore the bottom $B_{W,BO}$ and top $B_{W,TO}$ of the ARQ buffer on that DLC layer, which has a size $B_{W,max}$ are determined and the state of the automatic request buffer on that DLC layer, respectively the second status value is determined as:

$S2 = B_{W,max} - (B_{W,TO} - B_{W,BO}) + N_{DLC},$ wherein the term $N_{DLC}$ is the number of waiting PDU's in the DLC buffer for retransmission. Further the mobile terminal MT includes means 30 for estimating in the DLC-layer a first status value Si, which corresponds to the state of the automatic request buffer on the TCP-layer. Therefore a first set of data packets $N_{TCP}$, which is temporarily stored in the buffer on the DLC layer is determined as the first status value S1, which correspond to a free space in the ARQ buffer of the TCP layer. Then the means 40 in the mobile terminal MT calculates for the DLC-layer a target transmission rate $(N/T)_{target}$ as follows:

$$(N/T)_{target} = \min(S1, S2).$$

Because, as explained above, the access AP is responsible for the selection of a current transmission mode, the mobile terminal MT transmits the calculated target transmission rate value $(N/T)_{target}$ in a resource request protocol to the access point AP. Then, in the access point AP, the means 60 identifies from the set of all available transmission modes M1, . . . , M5 and M1', . . . ,M5' a subset $N_{subset}$ of transmission modes, which provide a reliable data transmission. That are all that transmission modes, which provides a maximum transmission of PDU's for radio link quality values RLQ lower than the current radio link quality $(RLQ)_c$. Then, in the access point AP, the means 70 selects from that subset $N_{subset}$ and the above determined further transmission mode $Mode_f$, that transmission mode as the current transmission mode $Mode_c$, which provides a specific transmission rate $(N/T)_i$ closest to the calculated target transmission rate $(N/T)_{target}$. Then the PDU' are transmitted in that current transmission mode $Mode_c$.

In the downlink direction, where the access point AP is the transmitter and the mobile terminal MT is the receiver, further transmission mode $Mode_f$ and current transmission mode $Mode_c$ are determined using the same method as described for the uplink direction. Here, in the mobile terminal MT, the means 10 measuring the current radio link quality $RLQ_c$, and the means 50 determining the further transmission mode $Mode_f$, which are then transmitted with the resource request protocol to the access point AP. In the access point AP, the means 20 and the means 30 are established to determine and estimate a second S2 and first S1 status value and the means 40 calculating for the DLC layer in the access point AP the target transmission rate $(N/T)_{target}$, based on that first S1 and second S2 status value. Finally in the access point AP, the means 60 and the means 70 identify a subset $N_{subset}$ and select the current transmission mode $Mode_c$ from that subset $N_{subset}$.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed:

1. A method for selecting a current transmission mode in a data packet oriented communication system, wherein the current transmission mode is from a set of available transmission modes, each transmission mode provides a specific transmission rate for transmitting data packets, the data packets are transferred within a transceiver between an automatic request buffer on a higher layer and an automatic request buffer on a lower layer, and the data packets are transmitted from the transceiver on a radio link, the method comprising the steps of:
   measuring a current radio link quality for the radio link;
   estimating on the lower layer a first status value corresponding to a state of the automatic request buffer on the higher layer;
   determining on said lower layer a second status value corresponding to a state of the automatic request buffer on said lower layer;
   calculating for said lower layer a target transmission rate, wherein said target transmission rate is based on the first and the second status values;
   identifying from the set of the available transmission modes a subset of transmission modes, each of said transmission modes in the subset providing a maximum transmission of data packets for radio link quality values lower than the current radio link quality; and
   selecting from said subset a transmission mode as the current transmission mode that provides the specific transmission rate closest to the calculated target transmission rate.

2. The method according to claim 1, wherein the step of determining on the lower layer the second status value includes the steps of:
   identifying in the automatic repeat request buffer on said lower layer a free space, available for storing a second set of data packets; and
   identifying in said automatic repeat request buffer a third set of data packets to be retransmitted.

3. The method according to claim 2, wherein the step of estimating on the lower layer the first status value includes the step of temporarily storing on said lower layer a first set of data packets that are transferred from the higher layer.

4. The method according to claim 3, wherein a first data rate is further estimated based on the first set of data packets, which are temporarily stored on the lower layer within a time interval.

5. The method according to claim 4, wherein a second data rate and a third data rate are further determined for the time interval and the step of calculating the target transmission rate is based on the first data rate, the second data rate, and the third data rate.

6. The method according to claim 3, wherein a first data rate is further estimated based on a delay time between an input and output of the temporarily stored first set of data packets.

7. The method according to claim 6, wherein a second data rate and a third data rate are further determined for the time interval and the step of calculating the target transmission rate is based on the first data rate, the second data rate, and the third data rate.

8. The method according to claim 3, wherein a further transmission mode for transmitting the data packets on the radio link is determined and the selection of the current transmission mode is additionally performed on said further transmission mode.

9. The method according to claim 1, wherein a further transmission mode for transmitting the data packets on the radio link is determined and the selection of the current transmission mode is additionally performed on said further transmission mode.

10. The method according to claim 1, wherein the radio link quality and the current radio link quality are determined by the carrier to interference ratio (C/I) or the packet error rate (PER) of the radio link.

11. A transceiver in a data packet oriented communication system, wherein a current transmission mode is selectable from a set of available transmission modes, each transmission mode providing a specific transmission rate for transmitting data packets, the data packets transferable within the transceiver between an automatic request buffer on a higher layer and an automatic request buffer on a lower layer, and the data packets are transmittable from the transceiver via a radio link, said transceiver comprising:

means for measuring a current radio link quality for the radio link;

means for estimating on the lower layer a first status value corresponding to a state of the automatic request buffer on the higher layer; and means for determining on the lower layer a second status value corresponding to a state of the automatic request buffer on said lower layer;

means for calculating for the lower layer a target transmission rate, wherein the target transmission rate is based on the first and the second status values means for identifying from the set of available transmission modes a subset of transmission modes, each of said transmission modes in the subset providing a maximum transmission of data packets for radio link quality values lower than the current radio link quality; and means for selecting from said subset a transmission mode as the current transmission mode, said current transmission mode providing a specific transmission rate closet to the target transmission rate.

12. The transceiver according to claim 11 wherein the means for estimating the first status value includes means for storing data packets that are transferable from the higher layer into the lower layer.

13. The transceiver according to claim 12, further comprising means for determining a further transmission mode for transmitting the data packets on the radio link.

14. The transceiver according to claim 13, further comprising:

means for identifying from the set of the available transmission modes a subset of transmission modes, each of said transmission modes in the subset providing a maximum transmission of data packets for radio link quality values lower than the current radio link quality; and means for selecting from said subset a transmission mode as the current transmission mode, said current transmission mode providing a specific transmission rate closest to the target transmission rate.

15. The transceiver according to claim 11, further comprising means for determining a further transmission mode for transmitting the data packets on the radio link.

* * * * *